3,386,956
LOW TEMPERATURE CURABLE EPOXY RESIN ADHESIVE COMPOSITIONS WITH LONG STORAGE STABILITY

Aleksandra Chrobok Nawakowski, Glenbrook, and Artur Maurice Schiller and Samuel Shan-Ning Wang, Stamford, Conn., assignors to American Cyanamid Company, Stamford, Conn., a corporation of Maine
No Drawing. Filed Apr. 25, 1966, Ser. No. 544,693
6 Claims. (Cl. 260—47)

This invention in general, is concerned with certain novel low temperature curable polyepoxide adhesive compositions with prolonged storage stability. In a specific aspect, our invention also concerns a curing system for such adhesive which accelerates greatly the rate of cure once such cure is initiated.

In particular, our invention relates to the preparation and use of a unique bis-urea curing agent which is active at low temperatures when promoted by certain weakly acidic, amphoteric compounds such as dicyandiamide, stearic hydrazide, succinimide and cyanoacetamide. By the term "low temperatures cure" as employed herein, we are referring to cure temperatures of 187° F. or lower. At the moment, dicyandiamide and the acid anhydrides thereof are themselves popular high temperature curing agents for various resins with typical operating conditions at 325–350° F.

Polyepoxide containing adhesive formulations have become widely accepted as bonding materials for a divergent variety of structural elements including metals, wood, ceramics, glass and the like. The strength and hardness of the bond created by polyepoxide adhesives has made them a valuable bonding agent in the aircraft industry where reliability, thermal stability and ease of application and handling are factors of the utmost importance. In the manufacture of computers, radio sets, television receivers and many other devices where mixtures of metals, wood, glass, etc., are joined together in units which by the nature of their operation generate heat the use of such epoxy adhesives is ideally suited.

Up to the present, the most universally employed curing agents for these polyepoxide adhesive compositions are dicyandiamide or acid anhydrides thereof. These curing agents are excellent at conditions which permit a high cure temperature of the order of 350° F. at which cure temperature they induce a bond formation within 60 to 90 minutes. However, at relatively low temperatures of the magnitude of about 187° F. these curing agents are so slow in activity as to render them practically useless for low temperature cure operation. To be viewed as a satisfactory low temperature curing agent, a composition must be capable of inducing a cure or set of the adhesive within at least 90 minutes from the onset of application of curing temperatures. Further, the curing agent must be shelf-stable upon storage at room temperature for at least 5 days to enable the user to have confidence in the performance of the adhesive formulation which contains the curing agent.

In the past, when it was sought to speed up the activity of dicyandiamide or the like type curing agents by adding promoters, the system went too far in that direction and gave adhesive compositions which while having satisfactory fast cure when subjected to heating did not exhibit satisfactory storage stability since they caused the polyepoxide to cure into an intractable solid mass at room temperature. As a result of this, the prior art adhesive formulations on the market either had to be made up immediately before use from two separate solutions or else had to be stabilized during storage before use by being packed in Dry Ice to extend their stability long enough to permit factory use.

It is an object of the present invention to present to the adhesives art a polyepoxide adhesive composition which is at the same time capable of being cured to a hard set adhesive bond in 90 minutes, at temperatures of the order of 187° F. and yet is entirely stable at slightly elevated temperature (90° F.) for periods of from 5 to 10 days duration and at room temperature (75° F.) for periods of from 2 weeks to a month.

It is a further and more specific object to disclose and claim a low temperature curable adhesive composition which comprises a polyepoxide curable material, a bis-urea curing agent as more specifically defined below and a curing agent promoter selected from the group consisting of dicyandiamide, stearic hydrazide, succinimide and cyanoacetamide.

Accordingly, we claim our invention to reside in a novel concept for, and reduction to practice of, a new curing system for polyepoxide adhesives. As an essential component of said curing system, we have found that a bis-urea primary curing catalyst of the general type described below which in some instances, is by itself too inactive at low temperatures is activated by the use of a member of the group of four chemicals noted above.

The primary curing agents of our invention include those bis-urea curing agents which may be graphically represented by the structural formula:

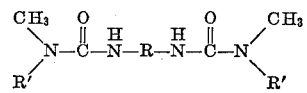

wherein R represents a divalent radical selected from the group consisting of methyl substituted phenylene, methylene diphenylene, dimethoxy-diphenylene and dimethyl diphenylene and R' represents a substituent selected from the group consisting of methyl, hydroxyethyl;

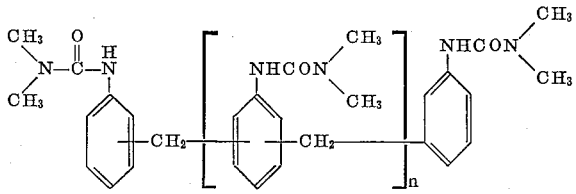

wherein $n$ represents an integer from 2 to 5 and

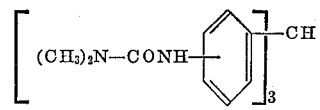

and

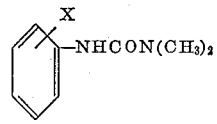

wherein X represents either $OCH_3$, Cl, H, $CH_3$ or $NO_2$.

This urea type curing agent component of the curing system is employed in the adhesive formulation in quantities of from 1 to 20 parts of the urea cure catalyst compound to 100 parts of polyepoxide. However, the catalyst promoter component which renders in many cases a slow curing agent satisfactory is present in quantities of from 1 to 20 parts per 100 parts of polyepoxide. The promoter compound is in most instances dicyandiamide. The result of this combination is quite unexpectedly synergistic as will be readily appreciated by a review of the comparative test data presented in following Table I of examples which shows what takes place when the two components of our novel curing system are put together to cure an epoxide resin, as compared with the result of either one alone.

The polyepoxide-containing compositions which can be cured using my novel catalyst comprise organic materials having a plurality of reactive 1,2-epoxy groups. These polyepoxide materials can be monomeric or polymeric, saturated or unsaturated, aliphatic, cycloaliphatic, aromatic or heterocyclic, and they may be substituted if desired with other substituents besides the epoxy groups, e.g. hydroxyl groups, ether radicals, halogen atoms, and the like.

A widely used class of polyepoxides which can be catalyzed according to the practice of the present invention encompasses the resinous epoxy polyethers obtained by reacting an epihalohydrin, such as epichlorohydrin, epibromohydrin, epiiodihydrin, and the like, with either a polyhydric phenol or a polyhydric alcohol.

Among the polyhydric phenols which can be used in preparing these resinous epoxy polyethers are dihydric phenols represented by the general formula:

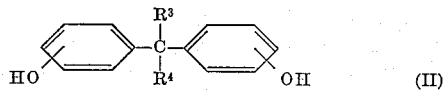
(II)

wherein the phenolic hydroxy groups may be in one of the 2,2'; 2,3'; 2,4'; 3,3'; 3,4'; or 4,4' positions on the aromatic nuclei, and each of $R^3$ and $R^4$ represent hydrogen, an alkyl group, such as methyl, ethyl, propyl, isopropyl, butyl, sec-butyl, tert.-butyl, pentyl, isopentyl, hexyl, isohexyl, and the like; a cyclo(lower)-alkyl group, such as a cyclohexyl or substituted cyclohexyl group, e.g., methyl-, ethyl-, propyl-, butyl-, pentyl- and hexyl-substituted cyclohexyl, or an aromatic group, such as phenyl, tolyl, xylyl, and the like. In addition, the phenolic rings may have other substituents besides the hydroxyl group, for example, lower alkyl groups containing from 1 to 4 carbon atoms, i.e., methyl, ethyl, propyl, isopropyl, butyl, sec-butyl and tert.-butyl groups, halogen atoms, i.e., fluorine, chlorine, bromine or iodine, and the like.

An illustrative but, by no means exhaustive listing of dihydric phenols falling within this general formula includes 4,4'-dihydroxydiphenyldimethylmethane (bisphenol A), 2,4' - dihydroxydiphenylethylmethane, 3,3' - dihydroxydiphenyldiethylmethane, 3,4' - dihydroxydiphenylmethylpropylmethane, 2,3' - dihydroxydiphenylethylphenylmethane, 4,4'-dihydroxydiphenylpropylphenylmethane, 4,4' - dihydroxydiphenylbutylphenylmethane, 2,2' - dihydroxydiphenylditolylmethane, 4,4'-dihydroxydiphenyltolylmethylmethane, and the like.

Other polyhydric phenols which may also be coreacted with an epihalohydric to provide these resinous epoxy polyethers are such compounds as resorcinol, hydroquinone, substituted hydroquinones, e.g., p-tert.-butylhydroquinone, and the like, indanols such as those disclosed in U.S. Patent 2,754,285 to Petropoulos, and polyhydric phenols having two hydroxyl aryl groups separated by an aliphatic chain of at least six carbon atoms in length, said chain being attached by carbon-to-carbon bonding to nuclear carbon atoms of the hydroxylaryl groups. Members of this latter class of polyhydric phenols can be conveniently obtained by condensing phenol substituted with an aliphatic side chain having one or more olefinic double bonds positioned therein, thus providing the required number of separating atoms between the two hydroxyphenyl groups of the resulting polyhydric phenol. Cardanol, obtainable in known manner from cashew nut shell liquid, is a convenient source of phenols containing such side chains.

Among the polyhydric alcohols which can be co-reacted with an epihalohydrin to provide these resinous epoxy polyethers are such compounds as ethylene glycol, propylene glycols, butylene glycols, pentane diols, bis(4-hydroxycyclohexy)diamethylmethane, 1,4-dimethylolbenzene, glycerol, 1,2,6-hexanetriol, trimethylol propane, mannitol, sorbitol, erythritol, pentaerythritol, their dimers, trimers and higher polymers, e.g., polyethylene glycols, polypropylene glycols, triglycerol, dipentaerythritol and the like, polyallyl alcohol, polyvinyl alcohol, polyhydric thioethers such as 2,2'-dihydroxydiethyl sulfide, 2'2', 3,3'-tetrahydroxydipropyl sulfide and the like, mercapto alcohols such as α-monothioglycerol, α,α'-dithioglycerol, and the like, polyhydric alcohol partial esters such as monostearin, pentaerythritol monoacetate and the like, and halogenated polyhydric alcohols such as the monochlorohydrins of glycerol, sorbitol, pentaerythritol and the like.

When preparing these resinous epoxy polyethers from an epihalohydrin and a polyhydric phenol, the reaction will preferably be carried out in the presence of an amount of an alkaline material, e.g., sodium hydroxide or potassium hydroxide, sufficient to combine with the halogen released by the epihalohydrin during the course of the reaction. The amount of epihalohydrin used is generally in excess of the stoichiometric quantity required for reaction with the epihalohydrin. In addition, the reaction will preferably be carried out at a temperature ranging from about 50° C. to about 150° C., usually for periods of time ranging up to several hours.

When reacting an epihalohydrin with a polyhydric alcohol, the reaction is preferably carried out in the presence of an acid-acting material, e.g., hydrofluoric acid or a boron trifluoride-ether complex, and the resulting halohydrin product is then dehydrohalogenated in the presence of an alkaline material.

The resulting resinous reaction products may contain free terminal hydroxyl groups or terminal hydroxyl groups and terminal epoxy groups, and will vary in molecular depending on the reactants employed, the relative amounts thereof, and the extent to which the reaction is carried out. These thermosetting epoxy resinous materials are generally soluble in solvents such as acetone, methyl ethyl ketone, methyl isobutyl ketone, cyclohexanone, and the like.

A related class of polymeric polyepoxides which can be catalyzed according to the practice of the present invention comprises the polyepoxypolyhydroxy polyethers obtained by reacting, again preferably in alkaline medium a polyhydric phenol such as bisphenol A, resorcinol, catechol and the like, or a polyhydric alcohol such as glycerol, sorbitol, pentaerythritol and the like, with a polyepoxide such as bis(2,3-epoxypropyl)ether, bis(2,3-epoxy - 2 - methylpropyl)-ether, 1,2-epoxy-4,5-epoxypentane and the like.

Another class of polymeric polyepoxides which can be cured by means of the above-described curing agents includes the epoxy novolac resins obtained by reacting, preferably, in the presence of a basic catalyst, e.g., sodium or potassium hydroxide, and epihalohydrin such as epichlorohydrin with the resinous condensate of an aldehyde, e.g., formaldehyde, and either a monohydric phenol, e.g., phenol itself, or a polyhydric phenol, e.g., bisphenol A. A representative number of the epoxy novolac resins obtained by reacting an epihalohydrin with a monohydric phenol-formaldehyde resinous condensate can be represented by the general formula:

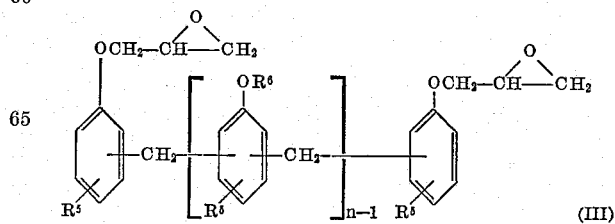
(III)

wherein, for example, $R^5$ represents either hydrogen or a lower alkyl group, such as methyl, ethyl, and the like, $R^6$ represents hydrogen, a halohydrin group, e.g.,

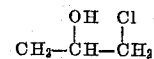

a glycol group, e.g.,

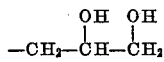

or a glycidyl group, i.e.,

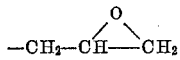

and $n$ is a number of 1 or greater. Similarly, a representative number of the epoxy novolac resins obtained by reacting an epihalohydrin with a polyhydric phenol-formaldehyde resinous condensate can be represented by the general formula:

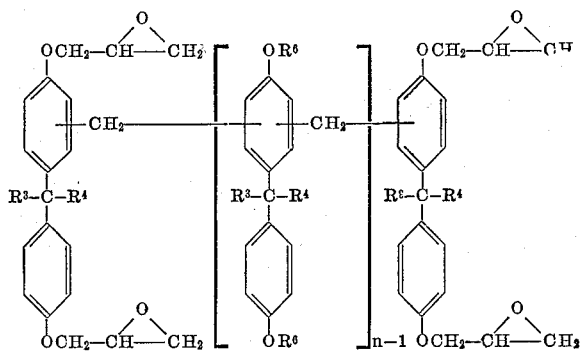

(IV)

wherein $R_3$ and $R_4$ are as defined for Formula II above and $R^6$ and $n$ are as defined for Formula III above. Further details concerning the nature and preparation of these epoxy novolac resins can be obtained in Carswell, T. S., "Phenoplasts" (New York: Interscience Publishers, 1947) page 29 et seq.

Still another class of polymeric polyepoxides which can be catalyzed with the above-described curing agents includes polymers, i.e., homopolymers and copolymers, of epoxy-containing monomers which also contain at least one polymerizable double bond. Such monomers can be polymerized through their double bonds in known manner, e.g., in bulk or in solution in an inert organic solvent such as benzene and the like, preferably by heating in the presence of oxygen or a peroxide catalyst but, in the absence of alkaline or acidic catalysts, leaving the epoxy groups unaffected and, therefore, regularly or randomly dispersed along the polymer chains. Among such ethylenically unsaturated epoxy-containing monomers are vinyl 2,3-glycidyl ether, allyl 2,3-glycidyl ether, methallyl 2,3-glycidyl ether, methallyl 3,4-epoxybutyl ether, glycidyl acrylate, glycidyl methacrylate, 2,3-epoxypropyl crotonate, vinyl cyclohexane monoxide, 4-glycidyloxystyrene, and the like. Suitable comonomers for copolymerization with these ethylenically unsaturated epoxy-containing monomers include styrene, acrylonitrile, methacrylonitrile, methyl acrylate, ethyl acrylate, methyl methacrylate, vinyl chloride, vinylidene chloride, vinyl acetate, diallyl phthalate, and the like.

Among the monomeric polyepoxides which can be catalyzed according to the practice of the present invention are the di- and triepoxides represented by the general formula:

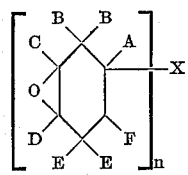

(V)

wherein A through F represent hydrogen or an alkyl group, preferably a lower alkyl group having from 1 to 4 carbon atoms, inclusive, such as methyl, ethyl, propyl, n-butyl and the like, and X represents a divalent radical which can be:

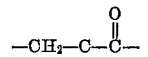

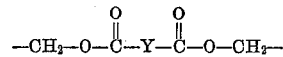

or

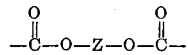

in which case $n$ equals 2, or a trivalent radical which can be

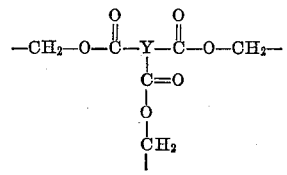

or

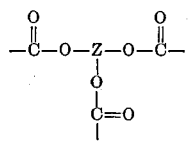

in which case $n$ equals 3, with Y representing an aliphatic or aromatic hydrocarbon radical containing from 2 to 12 carbon atoms, inclusive, and Z representing a lower aliphatic hydrocarbon radical or a lower oxyalkylene group, e.g., -alkylene-O-alkylene- and the like. Included among such di- and triepoxides are 3,4-epoxycyclohexylmethyl 3,4-epoxy-cyclohexanecarboxylate, 3,4-epoxy-6-methylcyclohexymethyl 3,4 - epoxy-6-methylcyclohexanecarboxylate, bis(3,4-epoxycyclohexylmethyl)maleate, bis (3,4 - epoxy-6-methylcyclohexylmethyl)-succinate, ethylene glycol bis(3,4 - epoxycyclohexanecarboxylate), 2-ethyl-1,3-hexanediol bis(3,4 - epoxy-6-methylcyclohexanecarboxylate), tris(3,4 - epoxycyclohexylmethyl)1,2,4-hexanetricarboxylate, glyceryl tris(3,4-epoxy-6-methylcyclohexanecarboxylate) and the like.

Other monomeric polyepoxides which can be cured by means of the above-described substituted curing agents include dicyclopentadiene dioxide, epoxidized triglycerides such as epoxidized glycerol trioleate, epoxidized glycerol trilinoleate, the diacetate of epoxidized glycerol trilinoleate and the like, 1,8-bis-(2,3-epoxypropoxy)octane, 1,4 - bis(2,3 - epoxypropoxy)cyclohexane, 1,4 - bis(3,4-epoxybutoxy) - 2 - chlorocyclohexane, 1,3-bis(2,3-epoxypropoxy)benzene, 1,4 - bis(2,3 - epoxypropoxy)benzene, 1,3-bis(2 - hydroxy-3,4-epoxybutoxy)benzene, 1,4-bis(2-hydroxy-4,5-epoxypentoxy)benzene, 1,3 - bis(4,5-epoxypentoxy)-5-chlorobenzene, 4,4'-bis(2,3 - epoxypropoxy) diphenyl ether, and epoxy ethers of polybasic acids such as diglycidyl succinate, diglycidyl adipate, diglycidyl maleate, digycidyl phthalate, diglycidyl hexachloroendomethylenetetrahydrophthalate and diglycidyl 4,4' - isopropylidenedibenzoate, and the like.

Many of these polyepoxides, and particularly those which are polymeric, can be conveniently referred to in terms of epoxy equivalency, i.e., the average number of epoxy groups per molecule in the polyepoxide material. Where the polyepoxide is monomeric and all of its epoxy groups are intact, its epoxy equivalency will be represented by an integer, usually 2 or greater. However, where the polyepoxide is polymeric its epoxy equivalency will usually be represented by a fractional value of at least about 1.0 or greater, e.g., 1.5, 1.8, 2.3, and the like, since the polymer will usually contain molecules of different molecular weight and can also contain some monomeric polyepoxide or have some of its epoxy groups dehydrated or otherwise reacted.

It will be appreciated by those skilled in the art that the catalyzed polyepoxide-containing compositions which can be prepared according to the practice of the present invention are not limited to those containing the above-described polyepoxides, but that said polyepoxides are to be considered merely as being representative of the class of polyepoxides as a whole. Further details concerning the nature and preparation of the above-described polyoxides can be found in U.S. Patents Nos. 2,633,458; 2,872,427 and 2,884,408, among others, which are incorporated herein by reference.

The resulting catalyzed polyepoxide-containing compositions can be used in any of the applications for which polyepoxides are customarily used, e.g., as adhesives, impregnants, surface coatings, potting and encapsulating compositions, in laminates, and particularly, as adhesives for bonding metallic elements or structures together.

Various conventionally employed additives can be admixed with these novel bis-urea type low temperature catalyzed polyepoxide-containing compositions prior to final cure. For example, in certain instances, it may be desired to add minor amounts of co-catalysts or hardeners along with our novel curing agents. Conventional pigments, dyes, fillers, flame-retarding agents and other compatible natural and synthetic resins can also be added. Furthermore, known solvents for the polyepoxide materials, such as acetone, methyl ethyl ketone, toluene, benzene, xylene, dioxane, methyl isobutyl ketone, dimethylformamide, Cellosolve acetate and the like can be used if desired and where necessary.

The quantity of bis-urea curing agent employed in our adhesive formulation is not critical to the successful operation thereof. Normally, a quantity of from 1 to 20 parts by weight of the total composition will be the curing agent to each 100 parts by weight of the epoxide component.

For practical and economic considerations, a range of 3 to 10 parts of the curing agent per 100 parts of epoxide is preferred as is also true with the promoter added.

The following examples illustrate the inventive aspects of our invention in their respective concrete modes of practice. Most of the examples set forth describe the formulation of our novel curing agents "per se" while various other examples describe their cure capacity at either 87° or 100° C. as adhesive compositions of matter. In all of the several examples, the quantities of reactants and reaction products are expressed in parts by weight, unless otherwise specifically designated. The following examples are intended solely to more precisely explain the nature and function of the invention, not to limit the underlying concept on which these embodiments are based. For a legal definition of the scope of our invention and its concept, one may refer only to the several claims appended hereto.

TABLE I.—EXAMPLES OF CURES OF EPOXY RESIN

| Example | Curing Agent, 10 Parts/100 Parts Epoxy | Promoter, 10 Parts/100 Parts Epoxy | Bench Stability (weeks) | 90 minute cure at— | |
|---|---|---|---|---|---|
| | | | | 87° C. (187° F.), Percent Epoxy Unreacted | 107° C., Percent Epoxy Unreacted |
| I | None | Dicyandiamide control | | 100 | 82 |
| II | 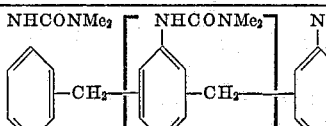 | None | <6 | 71 | |
| | | Dicyandiamide | <6 | 31 | |
| III | 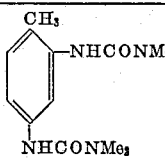 | None | 5 | 35 | |
| | | Dicyandiamide | 5 | 26 | |
| IV | 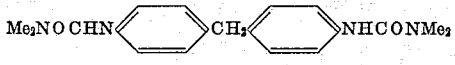 | None | | 75 | |
| | | Dicyandiamide | | 19 | |
| | | Stearic hydrazide | | 20 | |
| | | Cyanoacetamide | | 23 | |
| | | Succinimide | | 29 | |
| | | Adipic dihydrazide | | 28 | |
| V | 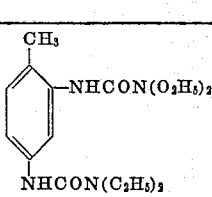 | None | 7 | 100 | 84 |
| | | Dicyandiamide | 7 | 100 | 16 |
| VI | 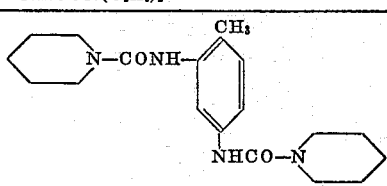 | None | 6 | | 50 |
| | | Dicyandiamide | 6 | | 29 |
| VII | 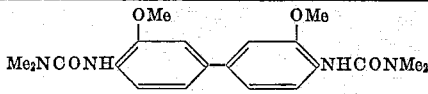 | None | <6 | | 56 |
| | | Dicyandiamide | <6 | | 29 |
| VIII | 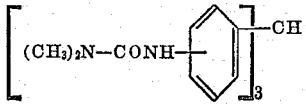 | None | <6 | | 35 |
| | | Dicyandiamide | <6 | | 14 |

TABLE I.—EXAMPLES OF CURES OF EPOXY RESIN—Continued

| Example | Curing Agent, 10 Parts/100 Parts Epoxy | Promoter, 10 Parts/100 Parts Epoxy | Bench Stability (weeks) | 90 minute cure at— | |
|---|---|---|---|---|---|
| | | | | 87° C. (187° F.), Percent Epoxy Unreacted | 107° C., Percent Epoxy Unreacted |
| IX | (methylphenyl)[N(H)—C(O)—N(CH₃)(CH₂—CH₂—OH)]₂ | None | <6 | | 80 |
| | | Dicyandiamide | 6 | | 15 |
| X | (CH₃)₂NCONH—(CH₂)₆—NHCON(CH₃)₂ | None | <8 | | 90 |
| | | Dicyandiamide | <8 | | 85 |
| XI | phenyl-CH₂NHCON(CH₃)₂ / CH₂NHCO(CH₃)₂ | None | | | 78 |
| | | Dicyandiamide | | | 18 |
| XII | Cl-phenyl-NHCON(CH₃)₂ | None | | 78 | 11 |
| | | Dicyandiamide | | 25 | 8 |
| XIII | phenyl-NHCON(CH₃)₂ | None | | 55 | 14 |
| | | Dicyandiamide | | 21 | 8 |
| XIV | CH₃-phenyl-NHCON(CH₃)₂ | None | | 60 | 8 |
| | | Dicyandiamide | | 25 | 6 |
| XV | NO₂-phenyl-NHCON(CH₃)₂ | None | | 85 | 20 |
| | | Dicyandiamide | | 30 | 12 |
| XVI | OCH₃-phenyl-NHCON(CH₃)₂ | None | | 70 | 17 |
| | | Dicyandiamide | | 28 | 11 |
| XVII | OCH₃-phenyl-NHCON(CH₃)₂ | None | | 90 | 41 |
| | | Dicyandiamide | | 50 | 9 |

We claim:

1. An adhesive composition comprising (A) an organic polyepoxide material having a plurality of reactive 1,2-epoxy groups (B) an effective amount of a curing agent selected from (1) a bis-urea of the structure:

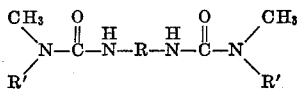

wherein R represents a divalent radical selected from the group consisting of methyl substituted phenylene, methylene diphenylene, dimethoxydiphenylene, and dimethyl diphenylene, R' represents a substituent selected from the group consisting of methyl and hydroxyethyl;

(2)

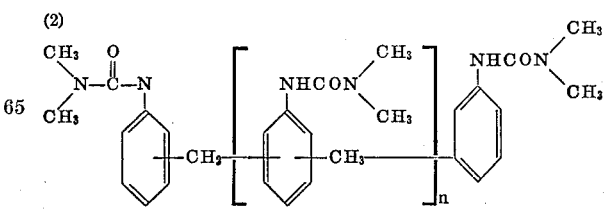

wherein n represents an integer from 2 to 5;

(3)

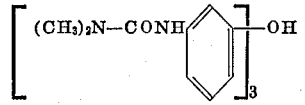

and (4) 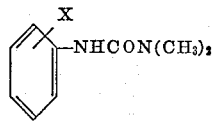

wherein X represents a group selected from the group consisting of OCH₃, Cl, H, CH₃ and NO₂ and (C) as a promoter for said curing agent (B) from 1 to 20 parts per 100 parts of organic polyepoxide of a promoter substance selected from the group consisting of dicyandiamide, stearic hydrazide, succinimide and cyanoacetamide.

2. An adhesive composition according to claim 1 which comprises (A) an organic polyepoxide material having a plurality of 1,2-epoxy groups (B) a bis urea curing agent of the structure:

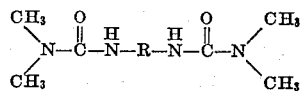

wherein R represents methyl substituted phenylene and (C) as a promoter for said curing agent (B) from 1 to 20 parts per 100 parts of organic polyepoxide, of a promoter substance.

3. An adhesive composition according to claim 2 wherein the promoter substance is dicyandiamide.

4. An adhesive composition according to claim 3 wherein the bis urea curing agent is present in amount of 1 to 20 parts per 100 parts of organic polyepoxide component.

5. An adhesive composition according to claim 4 wherein the curing agent (B) is the compound 1,1'-(4-methyl-m-phenylene) bis[3,3-dimethylurea] and the promoter substance (C) is dicyandiamide.

6. An adhesive composition according to claim 5 wherein the curing agent (B) is present in amount of 8 parts per 100 parts of organic polyepoxide and the promoter substance (C) is present in amount of 6 parts per 100 parts of organic polyepoxide.

References Cited
UNITED STATES PATENTS 2,876,260  3/1959  Huyser et al. _____ 260—47

WILLIAM H. SHORT, *Primary Examiner.*

T. D. KERWIN, *Assistant Examiner.*

Disclaimer 3,386,956.—*Aleksandra Chrobok Nawakowski*, Glenbrook, and *Artur Maurice Schiller* and *Samuel Shan-Ning Wang*, Stamford, Conn. LOW TEMPERATURE CURABLE EPOXY RESIN ADHESIVE COMPOSITIONS WITH LONG STORAGE STABILITY. Patent dated June 4, 1968. Disclaimer filed Sept. 24, 1968, by the assignee, *American Cyanamid Company*.

Hereby enters this disclaimer to claim 1 of said patent.

[*Official Gazette April 29, 1969.*]

UNITED STATES PATENT OFFICE
CERTIFICATE OF CORRECTION

Patent No. 3,386,956                                    June 4, 1968

Aleksandra Chrobok Nawakowski et al.

It is certified that error appears in the above identified patent and that said Letters Patent are hereby corrected as shown below:

Column 4, line 32, after "molecular" insert -- weight --
Column 5, lines 15 to 30, the formula should appear as shown below

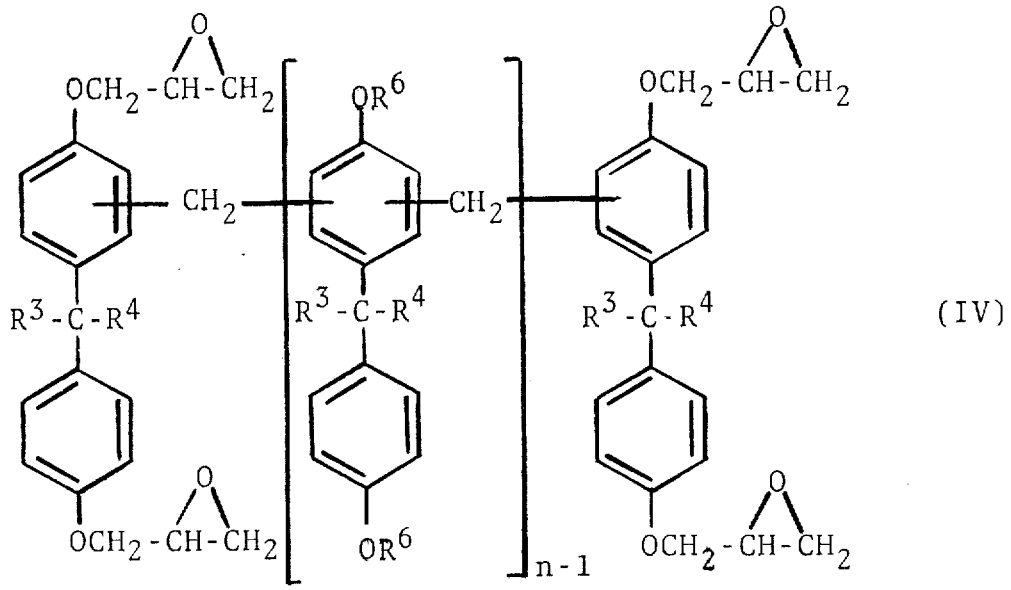

Column 6, line 37, "-methylcyclohexymethyl" should read -- -methylcyclohexylmethyl --. Columns 7 and 8, TABLE I, second column, opposite Example V, the formula should appear as shown below:

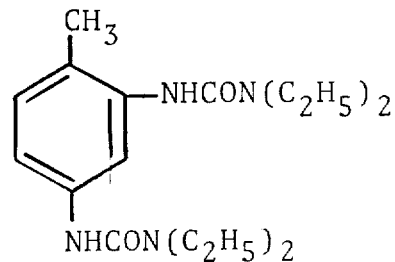

Column 10, lines 62 to 69, formula (2) should appear as shown below:

(2)

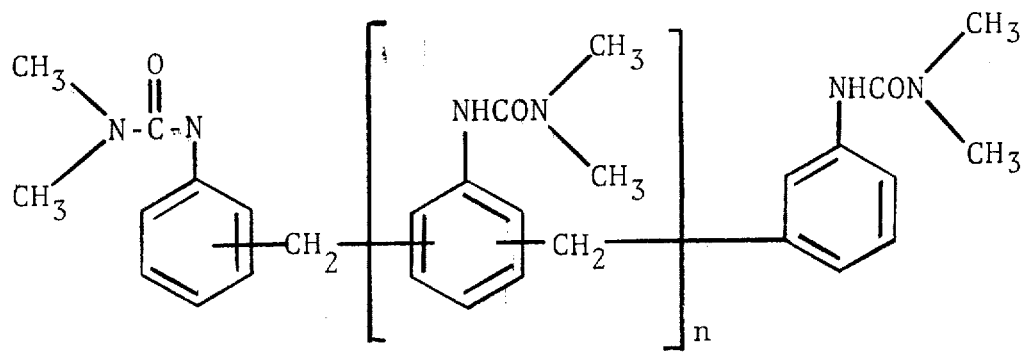

same column 10, lines 71 to 75, formula (3) should appear as shown below:

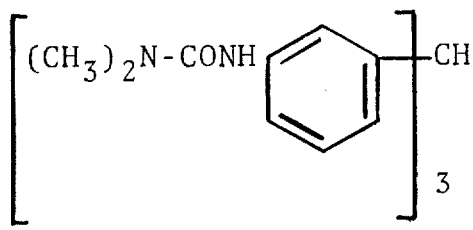

Signed and sealed this 10th day of March 1970.

(SEAL)
Attest:

EDWARD M. FLETCHER, JR.
Attesting Officer

WILLIAM E. SCHUYLER, JR.
Commissioner of Patents